(12) United States Patent
Glover et al.

(10) Patent No.: US 10,342,283 B2
(45) Date of Patent: Jul. 9, 2019

(54) MANUFACTURING IMPACT ABSORBING STRUCTURES FOR AN ATHLETIC HELMET

(71) Applicant: VICIS, Inc., Seattle, WA (US)

(72) Inventors: Travis Edward Glover, Seattle, WA (US); Anton Perry Alferness, Seattle, WA (US); Paul C. Leonard, Woodinville, CA (US)

(73) Assignee: VICIS, Inc., Seattle, WA (US)

( * ) Notice: Subject to any disclaimer, the term of this patent is extended or adjusted under 35 U.S.C. 154(b) by 234 days.

(21) Appl. No.: 15/399,044

(22) Filed: Jan. 5, 2017

(65) Prior Publication Data

US 2017/0196295 A1    Jul. 13, 2017

Related U.S. Application Data

(60) Provisional application No. 62/276,791, filed on Jan. 8, 2016.

(51) Int. Cl.
| | |
|---|---|
| *B29C 33/52* | (2006.01) |
| *B29C 45/44* | (2006.01) |
| *A42B 3/06* | (2006.01) |
| *A42B 3/12* | (2006.01) |
| *A42C 2/00* | (2006.01) |

(52) U.S. Cl.
CPC ............ *A42C 2/00* (2013.01); *A42B 3/063* (2013.01); *A42B 3/065* (2013.01); *A42B 3/121* (2013.01); *A42B 3/125* (2013.01); *B29C 33/52* (2013.01); *B29C 45/4457* (2013.01)

(58) Field of Classification Search
CPC .......................... B29C 33/52; B29C 45/4457
USPC .................. 264/317, 610, 629, 630
See application file for complete search history.

(56) References Cited

U.S. PATENT DOCUMENTS

| | | | | |
|---|---|---|---|---|
| 2,755,216 A | * | 7/1956 | Lemons | B64D 15/02 114/357 |
| 3,923,940 A | * | 12/1975 | Hujii | B28B 1/002 264/133 |

(Continued)

OTHER PUBLICATIONS

PCT International Search Report and Written Opinion, PCT Application No. PCT/US2017/012391, dated Mar. 13, 2017, 14 pages.

*Primary Examiner* — Jason L Vaughan
(74) *Attorney, Agent, or Firm* — BrainSpark Associates, LLC

(57) ABSTRACT

A garment worn by a wearer has an exterior shell and an interior shell with various impact absorbing material between the exterior shell and the interior shell. The impact absorbing material includes multiple structures, such as rods or filaments, capable of deforming when force is applied then returning to its state prior to application of the force. In various embodiments, the impact absorbing material is manufactured using injection molding to allow positioning of various structures in the impact absorbing material relative to each other during manufacture. During manufacturing, one or more living hinges are included in portions of the impact absorbing material to allow certain portions of the impact absorbing material to be accurately positioned relative to each other. Other manufacturing methods may be used, such as three-dimensional printing may be used to include structures in the impact absorbing material.

13 Claims, 11 Drawing Sheets

(56) References Cited

U.S. PATENT DOCUMENTS

| | | | | |
|---|---|---|---|---|
| 3,942,583 | A | * | 3/1976 | Baur ........................ B29C 33/38 |
| | | | | 164/246 |
| 5,176,864 | A | * | 1/1993 | Bates ....................... B29C 33/52 |
| | | | | 106/38.8 |
| 5,181,279 | A | | 1/1993 | Ross |
| 6,713,008 | B1 | * | 3/2004 | Teeter ................... B29C 70/025 |
| | | | | 264/240 |
| 9,126,387 | B2 | * | 9/2015 | Straza ........................ B32B 3/28 |
| 10,174,502 | B2 | * | 1/2019 | Kim .......................... E04B 1/90 |
| 2003/0173720 | A1 | * | 9/2003 | Musso ................. C04B 38/0006 |
| | | | | 264/635 |
| 2005/0246824 | A1 | * | 11/2005 | Berger ................... A42B 3/124 |
| | | | | 2/412 |
| 2010/0223730 | A1 | | 9/2010 | Pearce et al. |
| 2011/0250384 | A1 | | 10/2011 | Sumi et al. |
| 2013/0305435 | A1 | | 11/2013 | Surabhi |
| 2014/0196998 | A1 | | 7/2014 | Nauman et al. |

* cited by examiner

MANUFACTURING IMPACT ABSORBING STRUCTURES FOR AN ATHLETIC HELMET

CROSS-REFERENCE TO RELATED APPLICATIONS

This application claims the benefit of U.S. Provisional Patent Application No. 62/276,791, filed on Jan. 8, 2016, which is hereby incorporated by reference herein in its entirety.

BACKGROUND

A helmet protects a skull of the wearer from collisions with the ground, equipment, and other players. Present helmets were designed with the primary goal of preventing traumatic skull fractures and other blunt trauma. In general, a helmet includes a hard, rounded shell and cushioning inside the shell. When another object collides with the helmet, the rounded shape deflects at least some of the force tangentially while the hard shell distributes the normal force over a wider area of the head. Such helmets have been successful at preventing skull fractures but leave the wearer vulnerable to concussions.

A concussion occurs when the skull changes velocity rapidly relative to the enclosed brain and cerebrospinal fluid. The resulting collision between the brain and the skull results in a brain injury with neurological symptoms such as memory loss. Although the cerebrospinal fluid cushions the brain from small forces, the fluid does not absorb all the energy from collisions that arise in sports such as football, hockey, skiing, and biking. Helmets include cushioning to dissipate some of the energy absorbed by the hard shell, but the cushioning is insufficient to prevent concussions from violent collisions or from the cumulative effects of many lower velocity collisions.

SUMMARY

In various embodiments, a helmet includes two generally concentric shells with impact absorbing structures between the shells. The inner shell may be somewhat rigid to protect against skull fracture and the outer shell may also somewhat rigid to spread impact forces over a wider area of the impact absorbing structures positioned inside the outer shell, or the outer shell may be more flexible such that impact forces locally deform the outer shell to transmit forces to a smaller, more localized section of the impact absorbing structures positioned inside the outer shell. The impact absorbing structures are secured between the generally concentric shells and have sufficient strength to resist forces from mild collisions. However, the impact absorbing structures undergo deformation (e.g., buckling) when subjected to forces from a sufficiently strong impact force. As a result of the deformation, the impact absorbing structures reduce energy transmitted from the outer shell to the inner shell, thereby reducing forces on the wearer's skull and brain. The impact absorbing structures may also allow the outer shell to move independently of the inner shell in a variety of planes or directions. Thus, impact absorbing structures reduce the incidence and severity of concussions as a result of sports and other activities. When the outer and inner shell move independently from one another, rotational acceleration, which contributes to concussions, may also be reduced.

The helmet may include modular rows to facilitate manufacturing. A modular row includes an inner surface, an outer surface, and impact absorbing structures between the inner and outer surfaces. A modular row is relatively thin and flat compared to the assembled helmet, which reduces the complexity of forming the impact absorbing structures between the modular row's inner and outer surfaces. For example, the modular rows may be formed by injection molding, fusible core injection molding, or a lost wax process. When assembled, the inner surfaces of the modular rows may form part of the inner shell, and the outer surfaces of the modular rows may form part of the outer shell. Alternatively or additionally, the modular rows may be assembled between an innermost shell and an outermost shell that laterally secure the modular rows and radially contain them. In addition, adjacent rows may be laterally secured to each other.

The impact absorbing material may be manufactured using injection molding to facilitate positioning of various structures in the impact absorbing material relative to each other during manufacture (e.g., a stand-off). The benefit of manufacturing the impact absorbing material in rows is to allow the structure to be injection molded, which greatly reduces manufacturing complexity and cost. During manufacturing, one or more living hinges may be included in portions of the impact absorbing material to allow certain portions of the impact absorbing material to be accurately positioned relative to each other. Other manufacturing methods may be used to include structures in the impact absorbing material, such as three-dimensional printing, fusible core injection molding, or lost wax casting.

DETAILED DESCRIPTION

Modular Helmet

Figure 1:
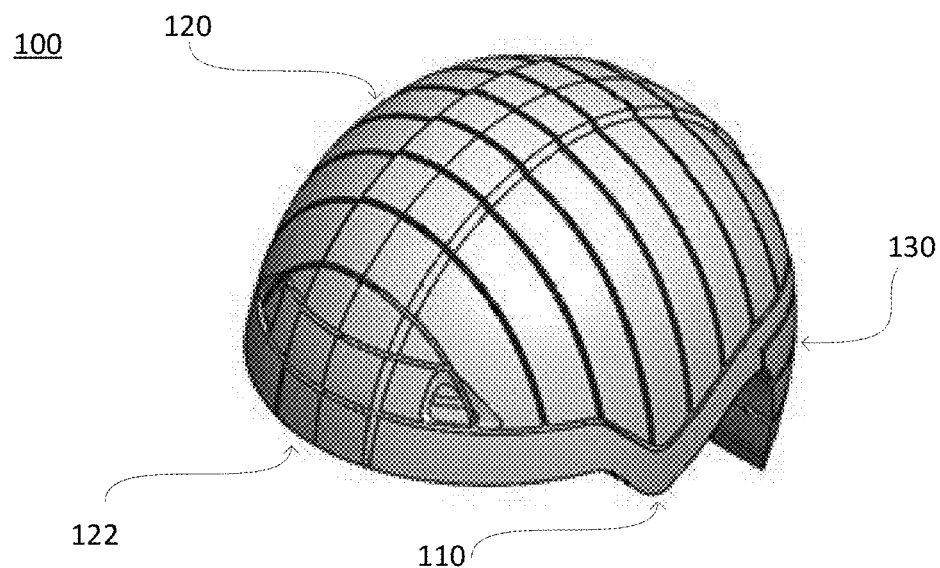
FIG. 1 is a perspective view of an assembly of impact absorbing structures formed from modular rows, in accordance with an embodiment.

FIG. 1 is a perspective view of an assembly 100 of impact absorbing structures formed from modular rows 110, 120, and 130, in accordance with an embodiment. In general, a modular row includes an inner surface, an outer surface, and impact absorbing structures between the inner surface and the outer surface. The modular row may further include a protective layer (e.g., foam) less rigid than the impact absorbing structures that encloses a remaining volume between the inner surface and outer surface after formation of the impact absorbing members. When a helmet including the assembly 100 is worn, the inner surface is closer to the user's skull than the outer surface. Optionally, the modular row includes end surfaces connecting the short edges of the inner surface to the short edges of the outer surface. The inner surface, outer surface, and end surfaces form a slice with two parallel flat sides and an arc or bow shape on two other opposing sides. The end surfaces may be parallel to each other or angled relative to each other. The modular rows include one or more base modular rows 110, crown modular rows 120, and rear modular rows 130. The assembly 100 may include further shells, such as an innermost shell, an outermost shell, or both, that secure the modular rows relative to each other and capture the structure between the innermost and outermost shells when assembled for durability and impact resistance.

The base modular row 110 encircles the wearer's skull at approximately the same vertical level as the user's brow. The crown modular rows 120 are stacked horizontally on top of the base modular row 110 so that the long edges of the inner and outer surfaces form parallel vertical planes. The end surfaces of the crown modular rows 120 rest on a top plane of the base modular row. The outer surfaces of the crown modular rows 120 converge with the outer surface of the base modular row 110 to form a rounded outer shell. Likewise, the inner surfaces of the crown modular rows 120 converge with the inner surface of the base modular row 110 to form a rounded inner shell. Thus, the crown modular rows 120 and base modular row 110 form concentric inner and outer shells protecting the wearer's upper head. The outer surface of a crown modular row 120 may form a ridge 122 raised relative to the rest of the outer surface. The ridge 122 may improve resistance to impact forces or facilitate a connection between two halves (e.g., left and right halves) of an outermost layer of a helmet including the assembly 100.

The rear modular rows 130 are stacked vertically under a rear portion of the base modular row 110 so that the long edges of the inner and outer surfaces form parallel horizontal planes. The inner surface of the topmost rear modular row 130 forms a seam with the inner surface of the base modular row 110, and the outer surface of the topmost rear modular row 130 forms a seam with the outer surface of the base modular row 110. Thus, the rear modular rows 130 and the rear portion of the base modular row 110 form concentric inner and outer shells protecting the wearer's rear lower head and upper neck.

Modular Row

Figure 2:
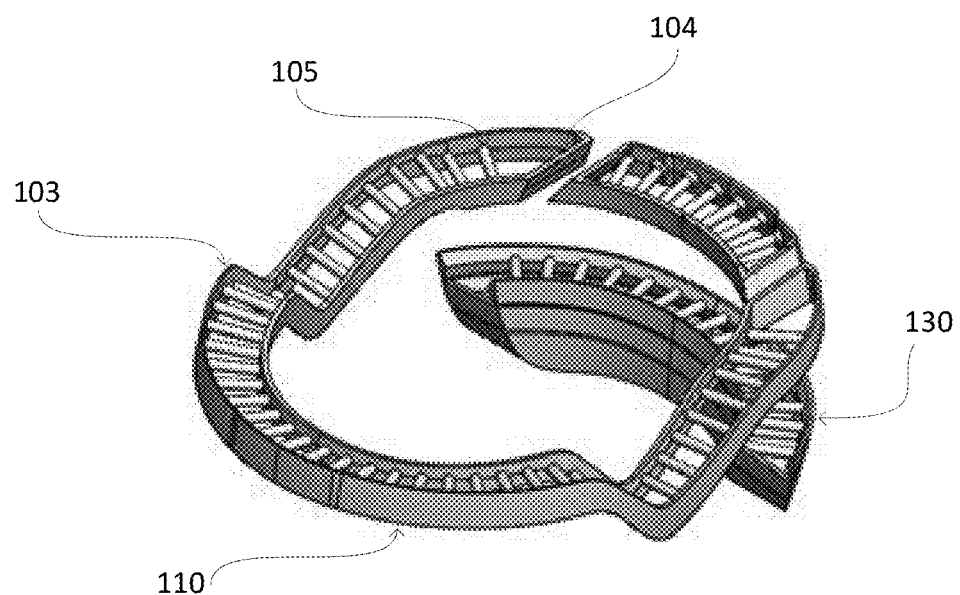
FIG. 2 is a perspective view of a modular row, in accordance with an embodiment.

FIG. 2 is a perspective view of a base modular row 110, in accordance with an embodiment. The base modular row 110 includes two concentric surfaces 103 (e.g., an inner surface and an outer surface), end surfaces, and impact absorbing structures 105.

As illustrated, the impact absorbing structures 105 are columnar impact absorbing members mechanically secured to both concentric surfaces 103. An end of the impact absorbing structure 105 may be mechanically secured to a concentric surface 103 as a result of integral formation, by a fastener, by an adhesive, by an interlocking end portion (e.g., a press fit), another technique, or a combination thereof. An end of the impact absorbing member is secured perpendicularly to the local plane of the concentric surface 103 in order to maximize resistance to normal force. However, one or more of the impact absorbing members may be secured at another angle to modify the resistance to normal force or to improve resistance to torque due to friction between an object and the outermost surface of a helmet including assembly 100. The critical force that buckles the impact absorbing member increases with the diameter of the impact absorbing member and decreases with the length of the impact absorbing member.

Generally, an impact absorbing member has a circular cross section to eliminate stress concentration along edges, but other cross-sectional shapes (e.g., squares, hexagons) may be used to simplify manufacturing or modify performance characteristics. Generally, an impact absorbing structure is formed from a compliant yet strong material such as an elastomeric substrate such as hard durometer plastic (e.g., polyurethane, silicone) and may include a core of a softer material such as open or closed-cell foam (e.g., polyurethane, polystyrene) or fluid (e.g., air). After forming the impact absorbing members, a remaining volume between the concentric surfaces 103 (that is not filled by the impact absorbing members) may be filled with foam, fluid, or another material less rigid than the impact absorbing members.

The concentric surfaces 103 are curved to form an overall rounded shape (e.g., spherical, ellipsoidal) when assembled into a helmet shape. The concentric surfaces 103 and end surfaces 104 may be formed from a material that has properties stiffer than the impact absorbing members such as hard plastic, foam, metal, or a combination thereof, or formed from the same material as the impact absorbing members. To facilitate manufacturing of the base modular row 110, a living hinge technique may be used. The base modular row 110 may be manufactured as an initially flat modular row, where the long edges of the concentric surfaces 103 form two parallel planes. For example, the base modular row 110 is formed by injection molding the concentric surfaces 103, the end surfaces 104, and the impact absorbing structures 105. The base modular row 110 may then be bent to form hinge. The living hinge may be created by injection molding a thin section of plastic between adjacent structures or rows. The plastic is injected into the mold such that the plastic fills the mold by crossing the hinge in a direction transverse to the axis of the hinge, thereby forming polymer strands perpendicular to the hinge, thereby creating a hinge that is robust to cracking or degradation.

Figure 3:
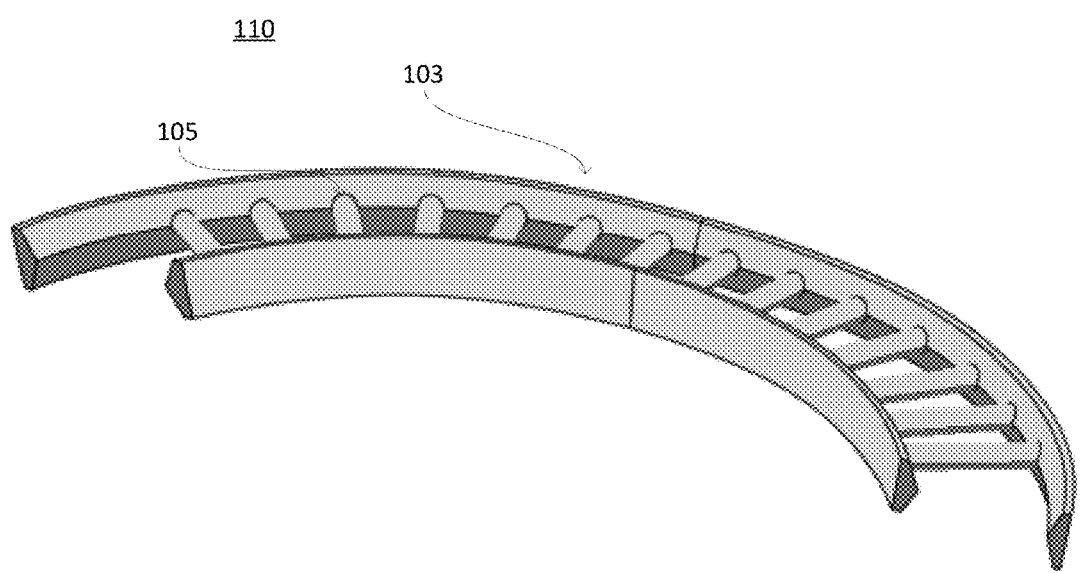
FIG. 3 is a perspective view of a modular row, in accordance with an embodiment.

FIG. 3 is a perspective view of a modular row 110, in accordance with an embodiment. The modular row 110 has a beveled edge with a cross-section that tapers from a base to an edge along which the impact absorbing members 105 are secured. For example, the modular row 110 has a pentagonal cross section where the impact absorbing members 105 are mechanically secured along an edge formed opposite the base of the pentagonal cross-section. The pentagon has two perpendicular sides extending away from the base of the pentagon to two sides that converge at an edge to which the impact absorbing members 105 are secured. As another example, the modular row 110 has a triangular cross section (e.g., isosceles triangle), and the impact absorbing members 105 are secured along an edge opposite the base of the triangular cross-section. Relative to a rectangular cross-section, the tapered cross-section reduces the mass to secure the impact absorbing members 105 to the base of the modular row 110. The base of the modular row 110 is generally wider than an impact absorbing member 105 in order to form a shell when assembled with adjacent modular rows 110. The general benefit of forming the base of the rows in this manner is to increase moldability of these structures.

Manufacturing Impact Absorbing Members

Figure 4A:
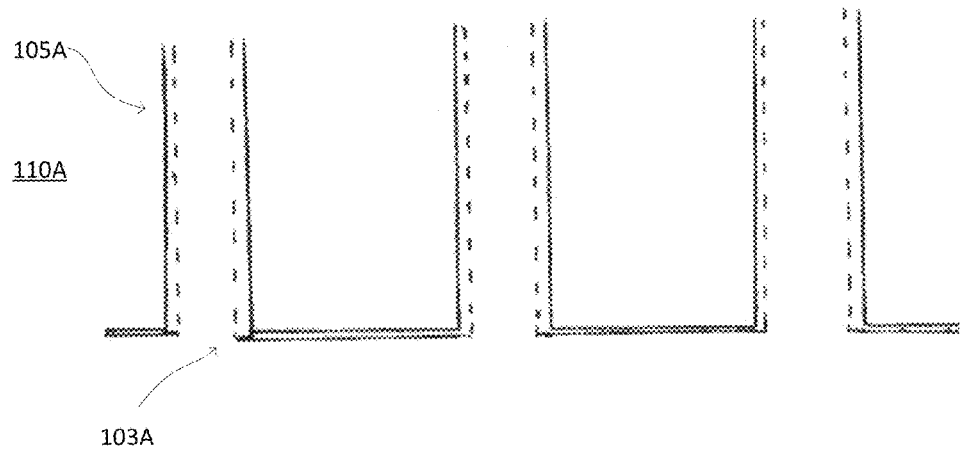
FIGS. 4A and 4B are cross-sectional views of an example process for manufacturing an impact absorbing member, in accordance with an embodiment.
Figure 4B:
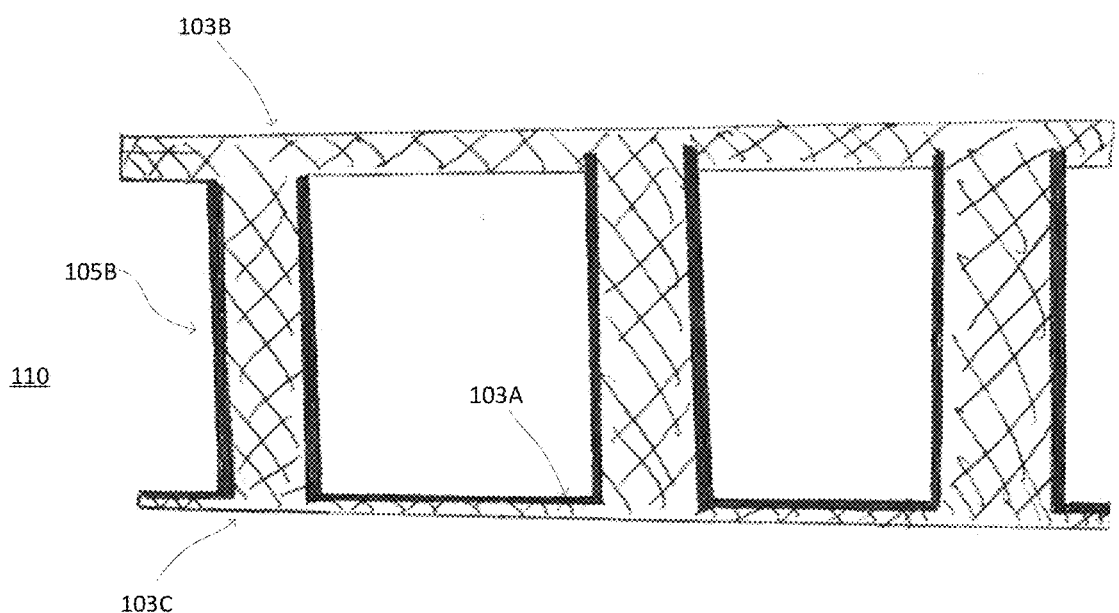

FIGS. 4A and 4B are cross-sectional views of an example process for manufacturing an impact absorbing member 105, in accordance with an embodiment. FIG. 4A illustrates a partially formed modular row 110A including a concentric surface 103A and impact absorbing members 105A formed through a standard injection molding, fusible core injection molding, or last wax casting process. Cores corresponding to an interior of the impact absorbing members 105 are formed (e.g., by molding or casting) from a core material (e.g., wax, chocolate, salt, soap, glycerine, tin-bismuth alloy, polyvinyl acrylate (PVA) support material). The cores are then held inside an injection mold to form hollow portions inside the impact absorbing members 105A. The injection molding forms the concentric surface 103A and the hollow columns of the impact absorbing members 105 around the cores. For example, the injection molding is performed by injecting a plastic (e.g., urethane) between upper and lower pieces of the injection mold. The cores are then removed from the impact absorbing members 105A using a process such as heating the core above the melting point of the core (e.g., wax) and below the melting point of the rigid plastic. As another example, the core is dissolved in a solvent that does not harm the structural integrity of the rigid plastic. As a result, the impact absorbing members 105 become hollow tubes secured on a planar or rounded concentric surface 103A.

FIG. 4B illustrates a modular row 110 including two concentric surfaces 103B and 103C as well as impact absorbing members 105B formed by combining foam with the partially formed modular row 110A. The foam forms the concentric surface 103B and augments the plastic of concentric surface 103A to form concentric surface 103C. For example, the foam is injected between two pieces of an injection mold. Thus, the injection molding process forms impact absorbing members 105 including a plastic shell filled with foam. The plastic increases a yield strength of the impact absorbing members 105 and increases the energy dispersed by deformation of the impact absorbing members. The foam further dissipates energy from collisions and increases a yield strength of the impact absorbing members 105 relative to a hollow cylindrical rigid plastic shell.

Although illustrated as being planar, the concentric surfaces 103 may be rounded, as illustrated in FIGS. 1 and 2. Further, the injection molding may be used to form impact absorbing members 105 between an inner and outer shell. However, multiple rows of impact absorbing members cannot be simultaneously manufactured via a traditional split mold injection molding process. If the injection molding process added a middle mold piece between first and second rows of impact absorbing members, the middle mold piece could not be removed without being broken down into small sections that could be maneuvered between the formed impact absorbing members 105. Thus, simultaneously forming multiple rows of impact absorbing members would require a complex molding process with an injection mold having more than two pieces, some of which would not be reusable. In contrast, a modular row 110 may be formed using an injection mold having only two halves, thereby simplifying the manufacturing process. The modular rows 110 are then assembled into a structure having multiple rows of impact absorbing members 105 distributed between two concentric shells.

As an alternative to using injection molding, the modular rows 110 may be formed through three-dimensional (3D) printing. For example, a 3D printer extrudes plastic to form layers of a lower concentric surface, then the impact absorbing members, and then an upper concentric surface. Example materials used in 3D printing include thermoplastics for fused filament fabrication, but other 3D printing materials and techniques may be used as well. The 3D printing process may be used to form the structure illustrated in FIG. 4A, and then another process (e.g., injection molding process with foam) may be used to form the structure in FIG. 4B. Alternatively, the 3D printing process may be used to form an entire modular row 110 from one or more materials or an entire matrix of impact absorbing structures in once piece.

Securing Impact Absorbing Members in Modular Row

FIGS. 5A-5G are cross-sectional views of impact absorbing members 105, in accordance with various embodiments. The impact absorbing members 105 may be mechanically secured at both ends to the concentric surfaces 103A and 103B using various techniques. The illustrated techniques may be used in any combination to secure one or both ends of the impact absorbing members 105 to concentric surfaces.

Figure 5A:
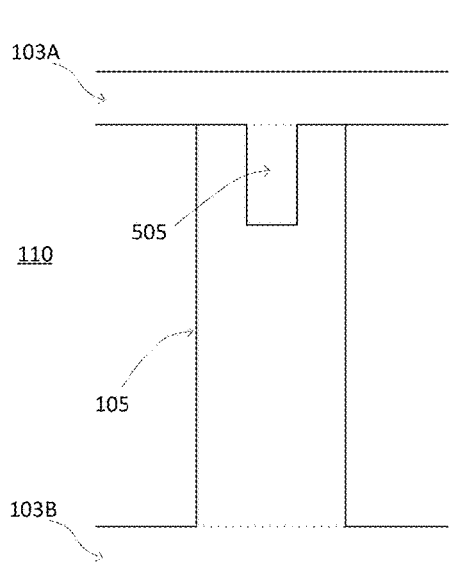
FIGS. 5A-5G are cross-sectional views of impact absorbing members, in accordance with various embodiments.
Figure 5B:
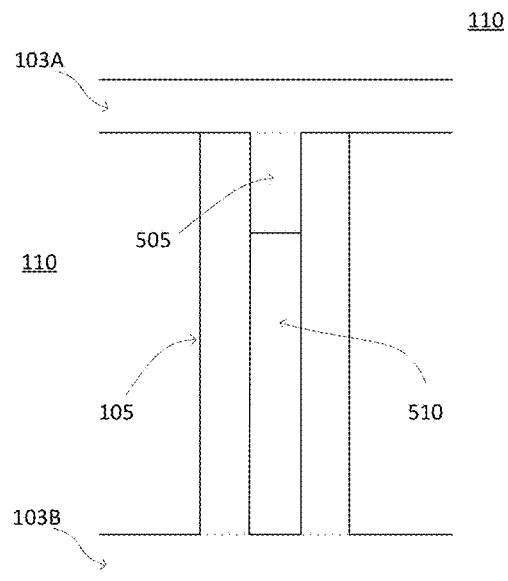

In FIGS. 5A and 5B, the surface 103A includes a protrusion 505, which may have a circular, square, or other shape. The impact absorbing member 105 forms a hole that accommodates the shape of the protrusion 505. In FIG. 5B, the surface 103A includes protrusion 505, and impact absorbing member 105 forms a hole 510 that accommodates the protrusion 505. The hole 510 may be filled with foam or may be hollow. For example, the hole 510 results from manufacturing the impact absorbing member 105 as a hollow cylindrical shell. Thus, the protrusion 505 interlocks with the hole to laterally secure the impact absorbing member 105. The protrusion 505 may also be adhesively bonded, heat welded, heat staked, or vibration welded into the hole 510.

Figure 5C:
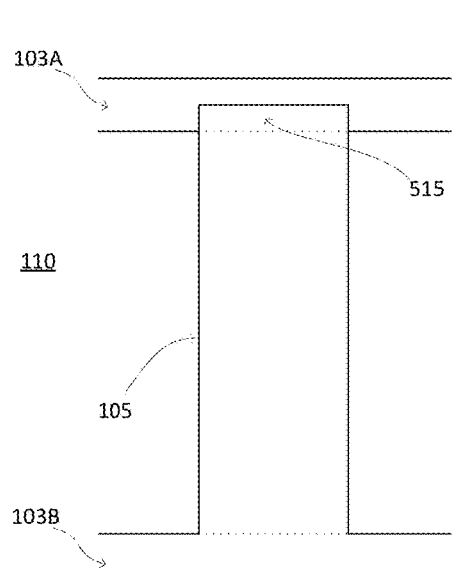
Figure 5D:
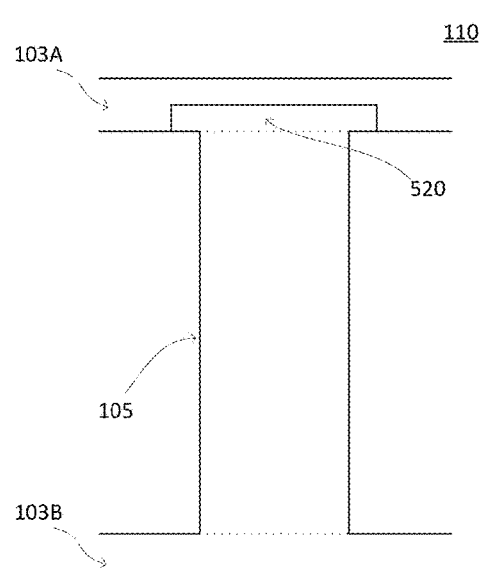

In FIG. 5C, the surface 103A forms a hole 515 that accommodates the shape of the protrusion 505. For example, the hole 515 is a cylindrical cavity to accommodate the cylindrical impact absorbing member 105. The impact absorbing member 105 may be press fit with the hole 515 to restrict the lateral and axial movement of the impact absorbing member 105. Alternatively, the clearance between the impact absorbing member 105 and the hole 515 may be greater than in a press fit but sufficiently small to laterally secure the impact absorbing member 105. The end of the impact absorbing member 105 may also be adhesively bonded, heat welded, heat staked, or vibration welded into the hole 515. In FIG. 5D, the surface 103A still forms a hole 515, but the impact absorbing member 105 further includes an end cap 520 having a greater cross-sectional area than the middle portion of the impact absorbing member 105. The hole and end cap 520 laterally secure the impact absorbing member (and may axially secure the impact absorbing member in a press fit). The end cap 520 beneficially increases a contact area between the surface 103A and the impact absorbing member 105. The end cap 520 may be a separate piece or integrally formed with the impact absorbing member 105. In the latter case, the end cap 520 may be forced into the hole, causing a transient deformation after which the end cap 520 would recover its shape due to its elastomeric properties.

Figure 5E:
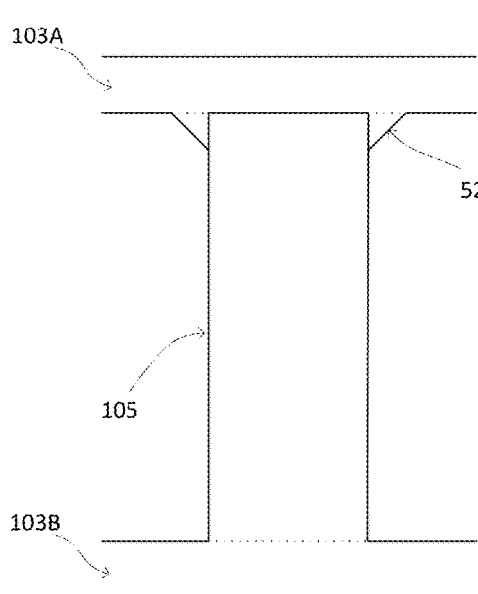

In FIG. 5E, the surface 103A includes collar 525. The collar 525 may completely encircle an end of the impact absorbing member 105 or may include one or more opposing pairs of arcs to secure opposite sides of the impact absorbing member 105. Relative to a protrusion 505, the collar 525 increases an area of contact between the impact absorbing member 105 and the surface 103A, so the collar 525 beneficially improves resistance to lateral forces. The impact absorbing member 105 may also be adhesively bonded, heat welded, heat staked, or vibration welded into the collar 525. FIGS. 5A-E illustrate the impact absorbing member 105 as being formed integrally with the surface 103B. Alternatively, the impact absorbing member 105 is formed separately from the surfaces 103A and 103B and mechanically secured at both ends by the above-described structures, adhesives, layered materials, fasteners, or a combination thereof.

Figure 5F:
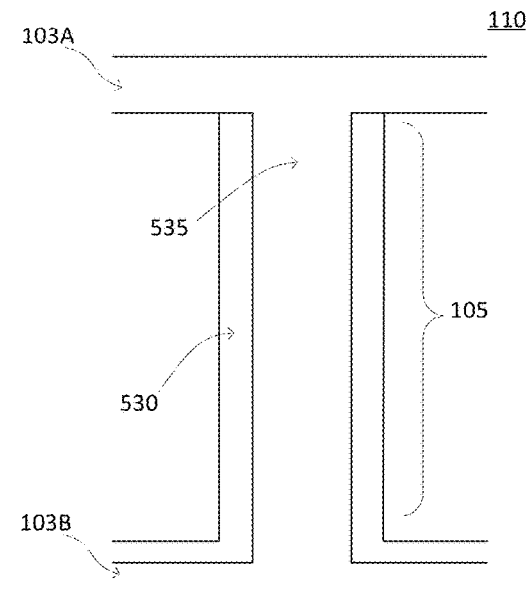

In FIG. 5F, the surfaces 103A, a lower layer of surface 103B, and a core of the impact absorbing member 105 are formed integrally from material 535, and an upper layer of surface 103B is integrally formed with an outer shell of the impact absorbing member 105 from material 530. For example, the process described with respect to FIGS. 4A and 4B may be employed, where material 530 is a plastic and material 535 is foam. By forming the connections between the impact absorbing member 105 and the surfaces 103A and 103B integrally, the process obviates a dedicated structure to laterally and axially secure the impact absorbing member relative to the surfaces 103A and 103B.

Figure 5G:
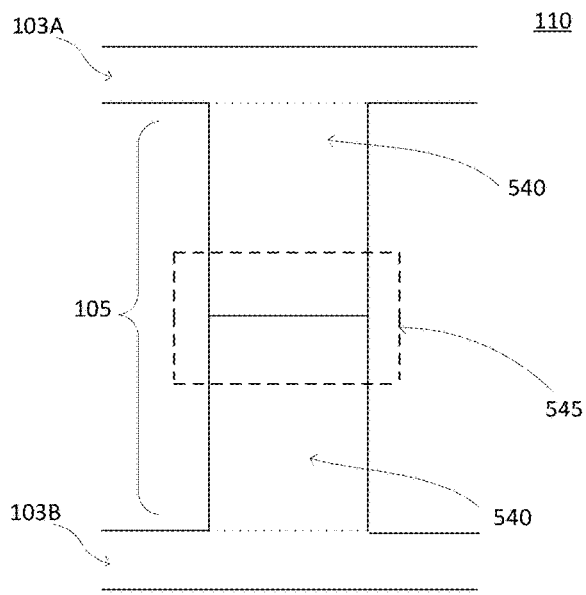

In FIG. 5G, the surfaces 103A and 103B are integrally formed with upper and lower portions 540 of the impact absorbing member 105. A collar 545 encircles a seam between the upper and lower portions 540 to laterally secure the upper and lower portions. For example, the collar 545 is formed from foam or rubber. Alternatively or additionally to the collar 545, one of the portions 540 includes a protrusion (such as protrusion 505) and the other portion 540 forms a hole to accommodate the protrusion. The protrusion may also be adhesively bonded, heat welded, heat staked, or vibration welded into the hole.

Layout of Impact Absorbing Members in Modular Row

FIGS. 6A-6H are cross-sectional views of impact absorbing members 105 arranged in a modular row 110, in accordance with various embodiments. As illustrated, the impact absorbing members 105 and modular row 110 may be formed through an injection molding process between a first piece of a mold above the modular row 110 and a second piece of the mold below the modular row 110. For example, the separation line 605 illustrates a contact surface between upper and lower pieces of the injection mold. Having no vertically stacked impact absorbing members 105 enables using a mold having only upper and lower pieces, which can be easily separated from the part by pulling them away from the part. If multiple impact absorbing members 105 were vertically stacked, the upper and lower pieces of the mold could not form the inward-facing contours of the impact absorbing members without using internal mold pieces, cores, or other inserts that would increase manufacturing complexity and cost. Removing internal mold pieces would add an additional manufacturing step, and it would be difficult to form reusable internal mold pieces. Thus, the illustrated arrangements ensure compatibility with an injection mold having only two pieces.

Figure 6A:
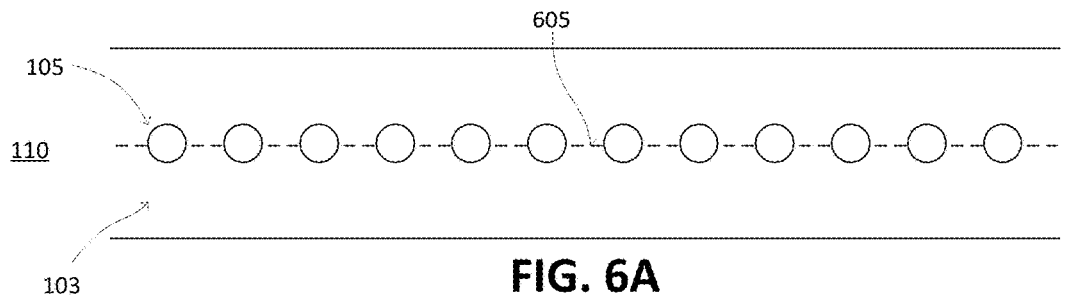
FIGS. 6A-6H are cross-sectional views of impact absorbing members arranged in a modular row, in accordance with various embodiments.
Figure 6B:
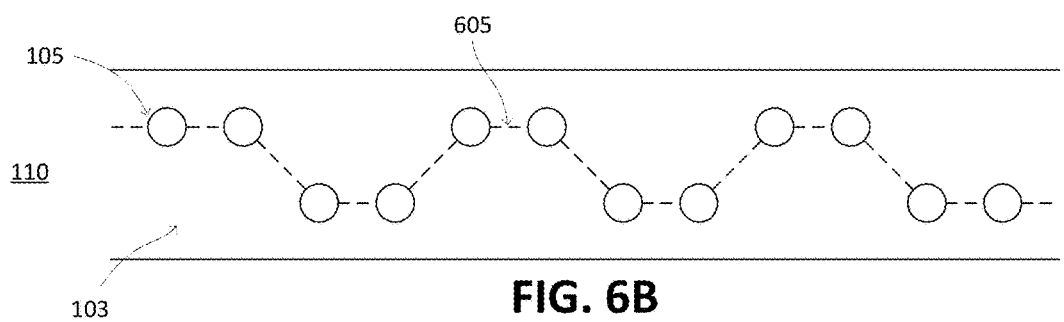
Figure 6C:
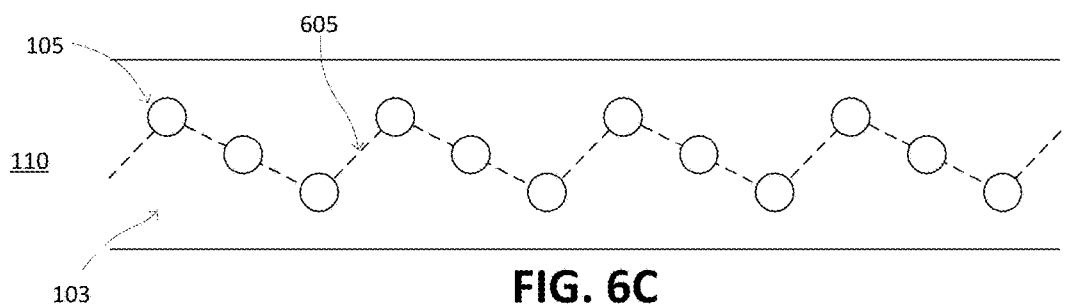
Figure 6D:
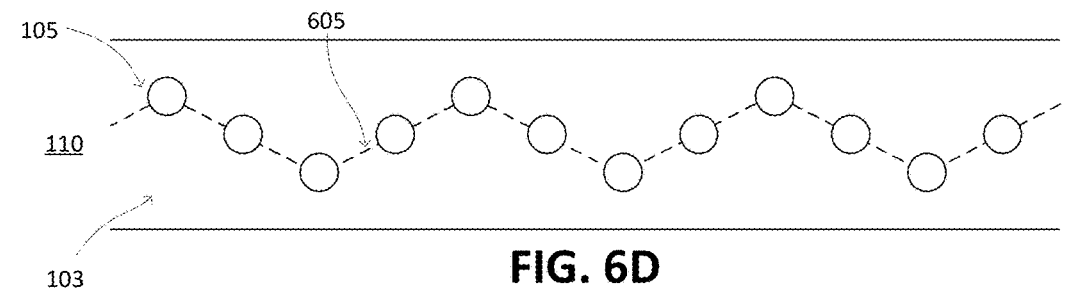
Figure 6E:
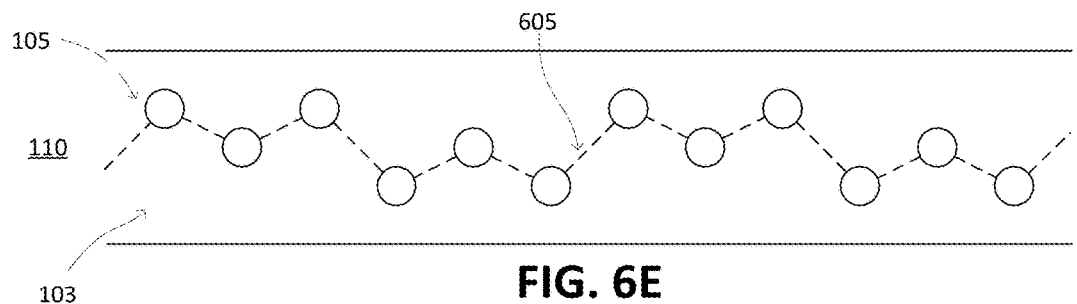
Figure 6F:
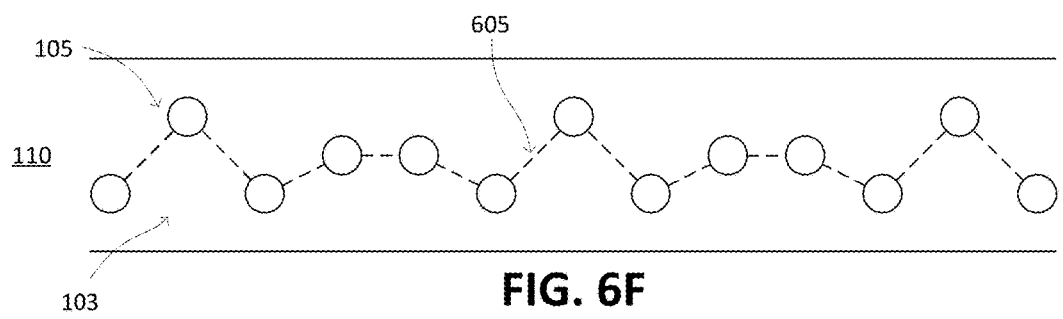
Figure 6G:
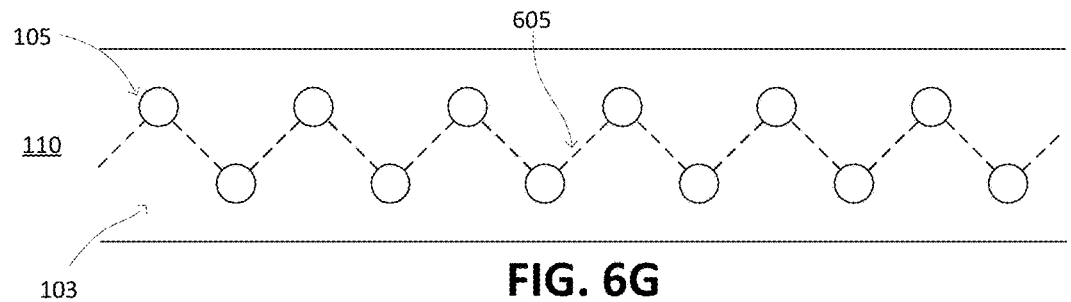
Figure 6H:
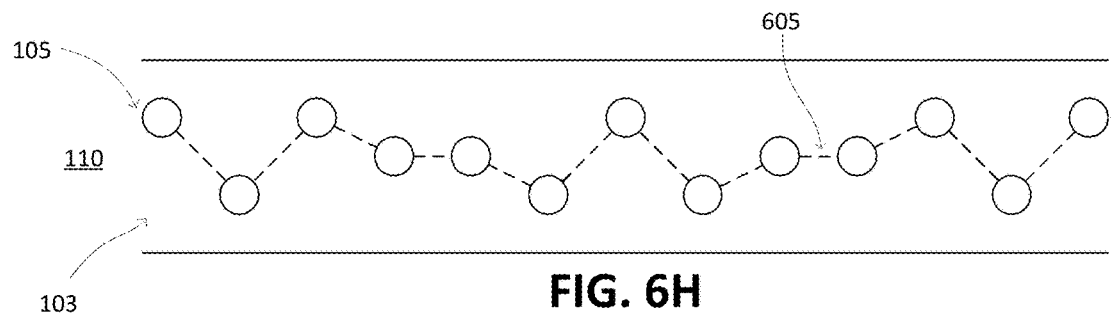

In FIG. 6A, the impact absorbing members 105 are arranged in a line. However, this arrangement may increase stress along those portions of the surface 103 vertically farthest from the impact absorbing members 105, particularly along the long edges of the modular rows 110. By spacing the impact absorbing members 105 across two or more vertical levels (as in FIGS. 6B-6H), stresses are distributed more evenly along the illustrated vertical dimension. The illustrated arrangements generally include a horizontally repeated spatial pattern of the impact absorbing members 105, which beneficially improves horizontal distribution of stress. The impact absorbing members 105 are connected by a single path traced by the separation line 605, which illustrates where upper and lower pieces of an injection mold meet to form the surfaces 103 and impact absorbing members 105 of the modular row 110. Because none of the impact absorbing members 105 overlap vertically, the modular row 110 may be formed in an injection mold having only two pieces. The impact absorbing members 105 may be horizontally spaces to provide at least two to three degrees of shut-off between vertical rows.

Figure 7A:
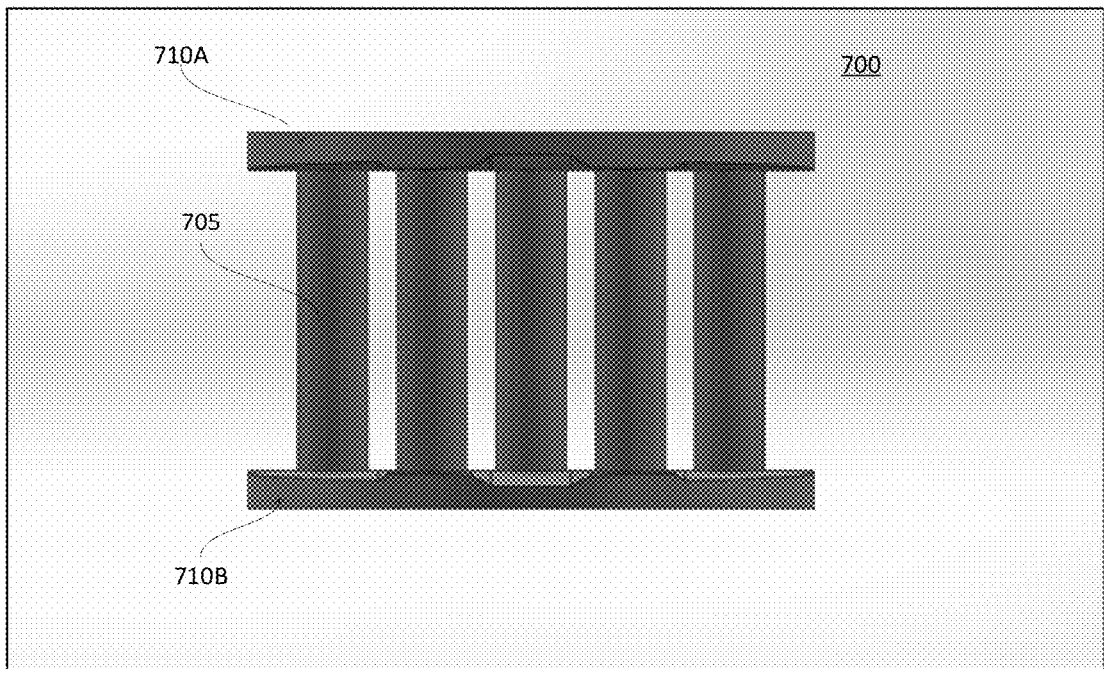
FIG. 7A is a front view of a core for manufacturing an impact absorbing member, in accordance with an embodiment.

FIG. 7A is a front view of an embodiment of a core 700 for manufacturing one or more impact absorbing members 705. The core 700 corresponds to the cavity from which the impact absorbing members 705 will be formed (e.g., by molding or casting) from a material (e.g., wax, chocolate, salt, soap, glycerine, tin-bismuth alloy, polyvinyl acrylate (PVA) support material), as further described above in conjunction with FIGS. 4A and 4B. The core 700 also includes portions corresponding to a concentric surface 710A and another concentric surface 710B, so when the core 700 is held between a side and an opposing side of a mold, injection molding forms the concentric surface 710A and the other concentric surface 710B, as well as hollow columnar structures around the interiors of the impact absorbing members 705 that comprise portions of the core 700.

Figure 7B:
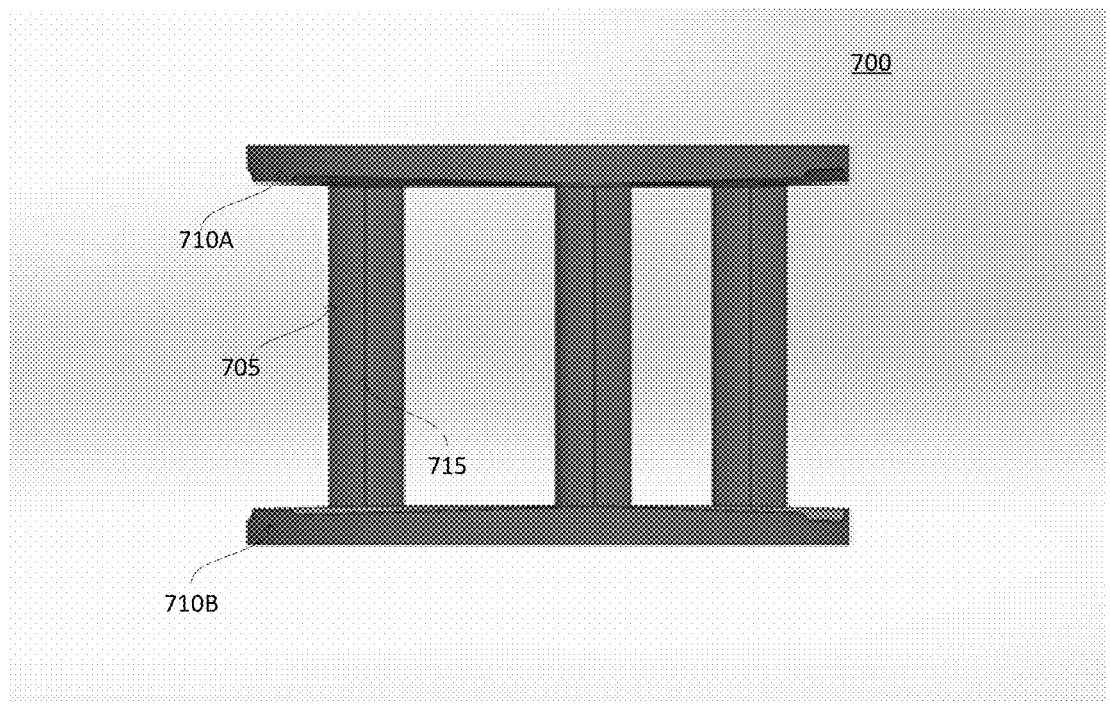
FIG. 7B is a side view of a core for manufacturing an impact absorbing member, in accordance with an embodiment.

FIG. 7B is a side view of the core 700 for manufacturing one or more impact absorbing members 705 shown in FIG. 7A. In FIG. 7B, a parting line 715 is shown on the portions of the core 700 corresponding to the interior of various impact absorbing members 705. The parting line 715 indicates a position on the core 700 where the side of the mold contacts the the opposing side of the mold when the core 700 is held within the mold. To facilitate removal of the mold from the core 700 after forming the concentric surface 710A and the other concentric surface 710B, as well as hollow columnar structures around the interiors of the impact absorbing members 705, the core 700 is tapered by a particular amount proximate to the parting line 715, the amount of taper (also referred to as draft) allows the mold to be more easily released after the concentric surface 710A and the other concentric surface 710B, as well as hollow columnar structures around the interiors of the impact absorbing members 705 are formed. The core 700 is tapered along a plane perpendicular to a plane including the parting line 715.

Figure 7C:
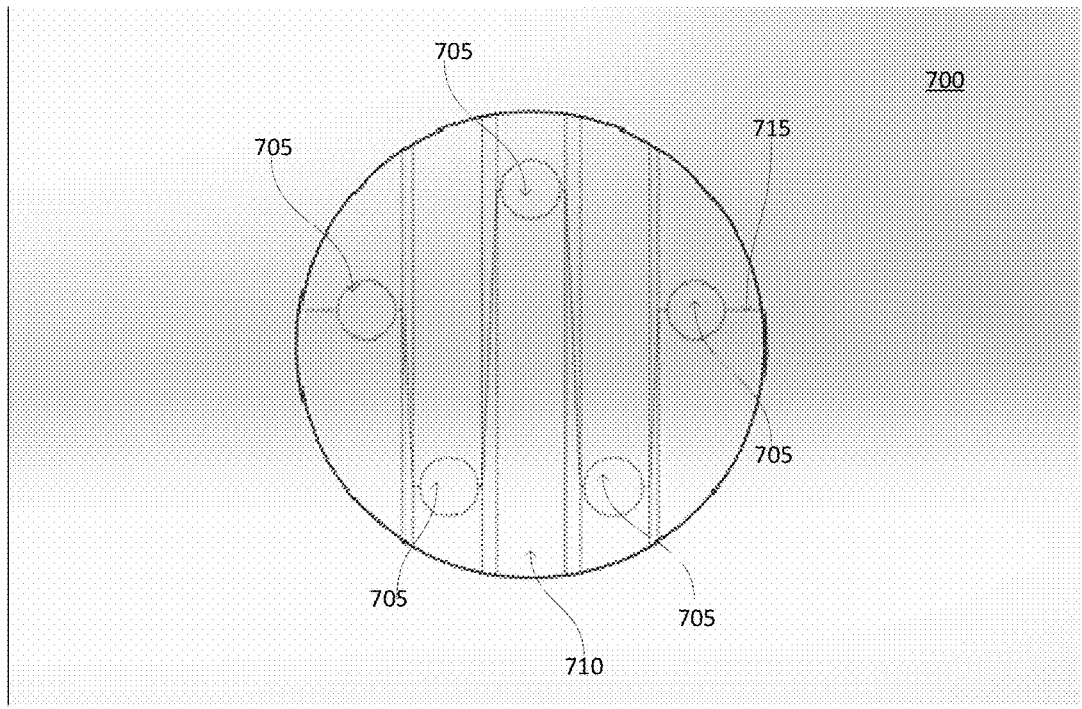
FIG. 7C is a transparent top view of a core for manufacturing an impact absorbing member, in accordance with an embodiment.
Figure 7D:
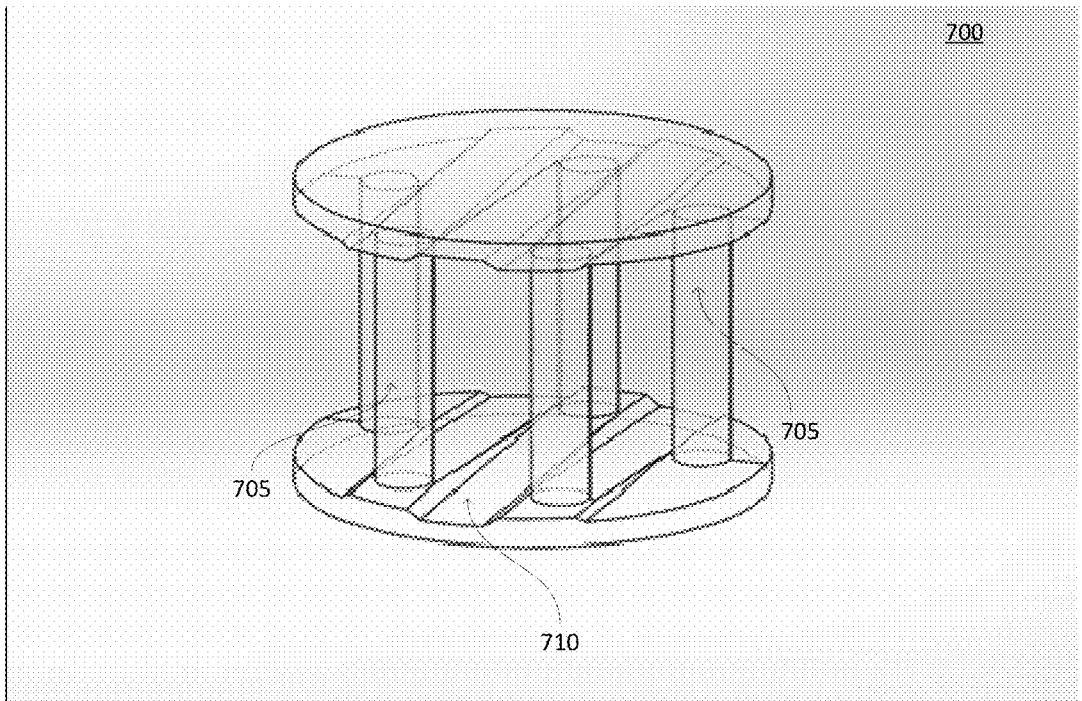
FIG. 7D is a transparent angled view of a core for manufacturing an impact absorbing member, in accordance with an embodiment.
Figure 8A:
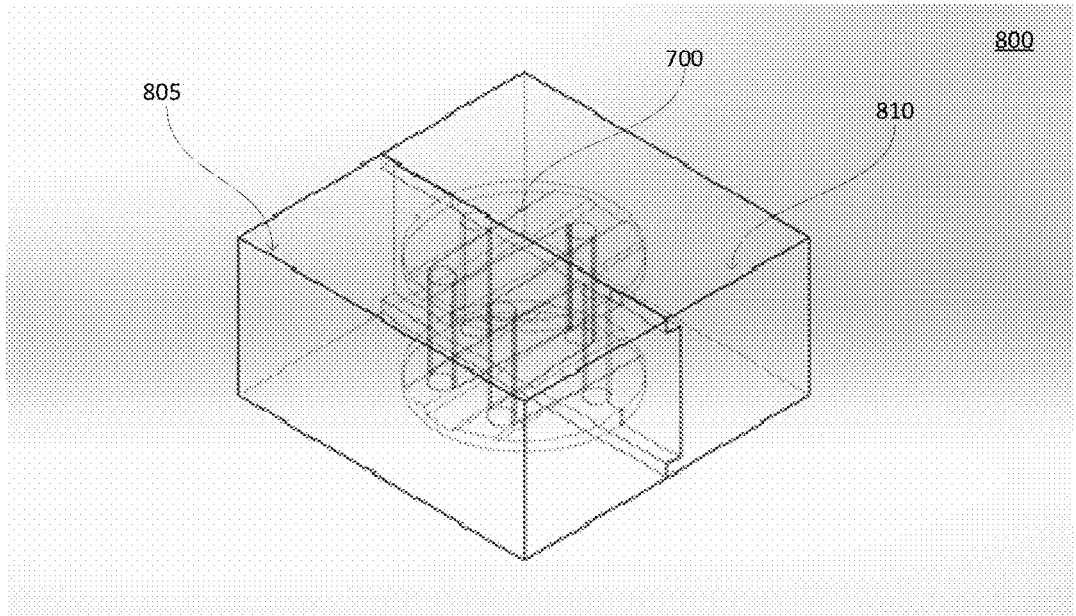
FIG. 8A is a transparent isometric view of a mold for manufacturing an impact absorbing member, in accordance with an embodiment.
Figure 8B:
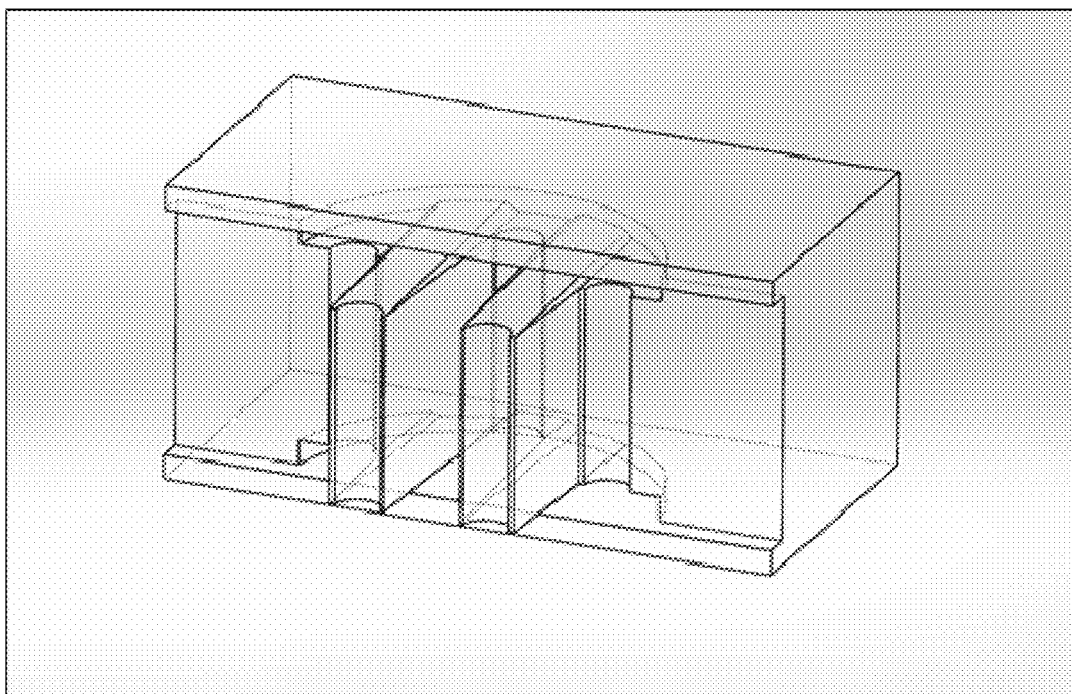
FIG. 8B is a transparent isometric view of a side of a mold for manufacturing an impact absorbing member, in accordance with an embodiment.
Figure 8C:
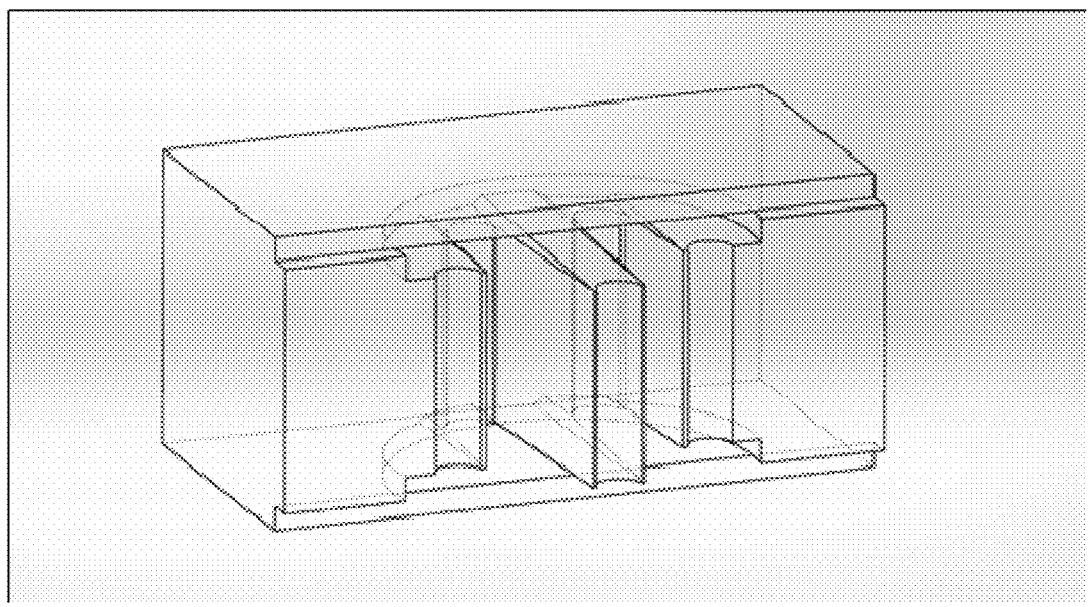
FIG. 8C is a transparent isometric view of an opposing side of a mold for manufacturing an impact absorbing member, in accordance with an embodiment.

FIG. 7C is a transparent top view of the core 700 for manufacturing an impact absorbing member also shown in FIGS. 7A and 7B. The parting line 715, indicating a location on the core 700 where the side and the opposing side of the mold contact each other when the core is placed in the mold is identified in FIG. 7C. FIG. 7D is a transparent angled view of the core 700 shown in FIG. 7A. As shown in FIG. 7D, the portion of the core corresponding to a concentric surface 710 is tapered by a particular amount (also referred to as draft)

to allow the mold to be more easily released after the concentric surface 710A and the other concentric surface 710B, as well as hollow columnar structures around the interiors of the impact absorbing members 705 are formed. The portion of the core 700 corresponding to the concentric surface 710 is tapered in a direction perpendicular to a plane including the portion of the mold contacting the portion of the core 700 corresponding to the concentric surface 710, To form the impact absorbing member using the core 700, the core 700 is held between a side and an opposing side of a mold, injection molding forms the concentric surface 710A and the other concentric surface 710B, as well as hollow columnar structures around the interiors of the impact absorbing members 705 that comprise portions of the core 700. FIG. 8A is a transparent isometric view of one embodiment of a mold 800 for manufacturing an impact absorbing member. As shown in FIG. 8A, the mold 800 includes a side 805 and an opposing side 810. The mold 800 holds the core 700 between the side 805 and the opposing side 810 so the side 805 contacts the opposing side 810 at a portion of the core 700 identified by the parting line 715 in FIGS. 7B and 7C. FIG. 8B is a transparent isometric view of a side 805 of the mold 800 shown in FIG. 8A, while FIG. 8C is a transparent isometric view of the opposing side 810 of the mold 800 shown in FIG. 8A. As further described above in conjunction with FIGS. 4A and 4B, in various embodiments a plastic (e.g., urethane) is injected between the side 805 and the opposing side 810 of the mold 800 while the core 700 is secured between the side 805 and the opposing side 810. The core 700 is subsequently removed from the resulting plastic structure to form impact absorbing members; for example; the core 700 is heated to a temperature above a melting point of a material comprising the core 700 (e.g., wax) and below the melting point of the plastic. As another example, the core 700 is dissolved in a solvent that does not harm the structural integrity of the plastic. Hence, the resulting impact absorbing members are hollow tubes secured on a planar or rounded concentric surface.

Although described throughout with respect to a helmet, the impact absorbing structures and manufacturing techniques described herein may be applied with other garments such as padding, braces, and protectors for various joints and bones.

Additional Configuration Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure.

What is claimed is:

1. A method for manufacturing a helmet comprising:
   forming a plurality of modular rows each including an upper surface, a lower surface, and a plurality of impact absorbing members contacting the upper surface at one end and contacting the lower surface at an opposite end, comprising:
   forming a core corresponding to interiors of the plurality of impact absorbing members from a material;
   aligning the core between a side and an opposing side of a mold, the side contacting the opposing side at a position of the core;
   injecting a material between the side and the opposing side of the mold while the core is aligned between the side and the opposing side; and
   removing the core from the plurality of impact absorbing members without altering the injected material;
   wherein the plurality of modular rows is formed by integrally forming columnar impact absorbing members with an upper layer of the lower surface, and integrally forming the upper surface, cores of the impact absorbing members, and a lower layer of the lower surface;
   assembling the plurality of modular rows by horizontally stacking the plurality of modular rows next to a base modular row included in the plurality of modular rows; and
   securing the plurality of modular rows relative to each other.

2. The method of claim 1, wherein removing the core from the plurality of impact absorbing members without altering the injected material comprises:
   heating the core to a temperature above the melting point of the material and below the melting point of the injected material.

3. The method of claim 1, wherein removing the core from the plurality of impact absorbing members without altering the injected material comprises:
   dissolving the material comprising the core in a solvent that does not affect the structural integrity of the injected material.

4. The method of claim 1, wherein the material is selected from a group consisting of: wax, chocolate, salt, soap, glycerin, tin-bismuth alloy, polyvinyl acrylate (PVA) support material, and any combination thereof.

5. The method of claim 1, wherein the material injected between the side and the opposing side of the mold while the core is secured between the side and the opposing side comprises a plastic.

6. The method of claim 5, wherein the plastic comprises urethane.

7. The method of claim 1, further comprising: injecting an additional material into interiors of the plurality of impact absorbing members.

8. The method of claim 7, wherein the additional material comprises a foam.

9. The method of claim 1, wherein the upper surface includes a protrusion and one end of an impact absorbing member includes a hole configured to accommodate a shape of the protrusion.

10. The method of claim 1, wherein the upper surface includes a hole and one end of an impact absorbing member includes a protrusion having a shape configured to be inserted into the hole.

11. The method of claim 1, wherein the upper surface includes a hole and one end of an impact absorbing member includes a protrusion having a shape configured to be inserted into the hole, the shape having a greater cross sectional area than the impact absorbing member.

12. The method of claim 1, wherein a modular row includes a horizontally repeated spatial pattern of the plurality of impact absorbing members that do not overlap vertically and are connected by a single path.

13. The method of claim 12, wherein the modular row includes impact absorbing member positioned in two or more vertical levels.

\* \* \* \* \*